2,935,494
MULTIPLE CYCLIC CARBONATE POLYMERS FROM ERYTHRITOL DICARBONATE

John M. Whelan, Jr., Murray Hill, and William P. Samuels, Jr., Bedminster, N.J., assignors to Union Carbide Corporation, a corporation of New York No Drawing. Application August 20, 1957
Serial No. 679,143

6 Claims. (Cl. 260—77.5)

This invention relates to the preparation of polymeric compositions of a multiple cyclic carbonate and aliphatic polyamines. More particularly, this invention relates to a polymeric substance prepared from erythritol dicarbonate having the structure

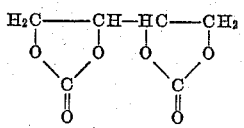

and polyfunctional aliphatic amines having a plurality of reactive amine groups, and preferably an amine having the general formula $R^1(NH_2)_x$, where $R^1$ is a polyvalent aliphatic hydrocarbon having a valence equal to $x$ and $x$ is an integer from two to four inclusive.

According to the present invention, we have now prepared a substantially linear polymer represented by the repeating units

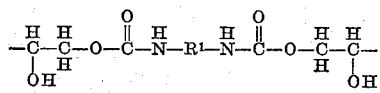

or

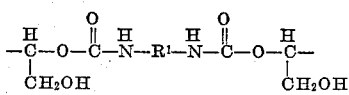

or mixtures of such repeating groups by the reaction of erythritol dicarbonate and difunctional primary amines.

These new linear polymeric substances have been found to possess a number of interesting properties which make possible their adaptation to a variety of uses. They are basically thermoplastic in nature. The polymer is nearly colorless and is obtained as a hard, colorless, brittle resin in the lower molecular weight products, or tough, rubbery solids for high molecular weight products. The polymer is quite soluble in solvents such as dimethylformamide and dimethyl sulfoxide, and can be readily cast into tough, colorless films having excellent clarity and tear resistance by extrusion or solvent casting techniques, or they can be extruded into fibers having high tensile strengths even at high elongation. The fibers are hydrophilic in nature, which tends to make them more dye receptive and decreases static build-up.

We have further discovered that with amines of higher functionality the erythritol dicarbonate produces a cross-linked infusible polymer which is particularly useful as casting or potting compositions. These materials are suitably hardened without catalysts at room temperature to hard, tough resins. The use of catalysts can, however, materially decrease the reaction time and curing time in production and use. They are also useful as adhesives or impregnants which can be cured to hard, infusible bonds.

The erythritol dicarbonate employed in producing the polymeric products of this invention is conveniently prepared from 1,4-dichlorobutane-2,3-diol and sodium bicarbonate according to the following scheme

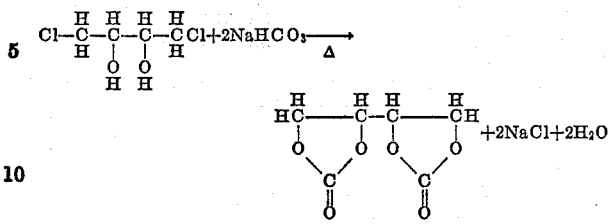

Preferably the reaction is conducted in an inert solvent such as dimethylsulfoxide or dimethylformamide or other suitable inert liquid. The reaction proceeds without need of a catalyst at elevated temperatures, with best results being secured at temperatures between about 70° C. and 140° C. The erythritol dicarbonate can be recovered in good yields, about 70 to 90%, as crystals melting about 165° C. or higher, by several means, such as by extraction of the reaction mixture with a solvent for the product which is immiscible with the reaction solvent and evaporating off the solvent, or by adding a liquid miscible with the reaction solvent which is a nonsolvent for the product.

The amines found to be particularly desirable in producing the linear polymeric products of this invention are the unhindered primary aliphatic diamines having the general formula

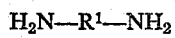

$$H_2N-R^1-NH_2$$

where $R^1$ is an alkylene group containing from about 2 to 20 carbon atoms. Typical of some of these diamines are ethylene diamine, hexamethylene diamine, and 1,3-diaminobutane. Aromatic amines we have found are unsuitable in that hydroxyalkylation products instead of hydroxypolyurethanes are prepared. Sterically hindered amines, for instance—menthane diamine—are not suitable because of their unreactive nature. However, secondary aliphatic amines can be used, but are not nearly as desirable as primary amines because of their reduced reactivity with the cyclic carbonate groups.

While the linear polymeric products produced from the erythritol dicarbonate and alkylene diamines are the preferred materials, we have found that insoluble, infusible, cross-linked polymers are prepared with amines of high functionality, such as triamines, pentamines, etc. for instance tris(aminoethyl) amine, tetraethylenepentamine, diethyl triamine, and the reaction products of any of these amines with glycidyl compounds.

For the preparation of linear polymers, the reaction components are preferably mixed in essentially equimolar proportions so that the highest molecular weight products are produced. In ratios other than equimolar, the molecular weight of the product will be decreased and many of the useful properties of the product will be lost. For the preparation of cross-linked, insoluble, infusible polymers from amines of a functionality higher than two, the ratio will depend primarily upon the system functionality. Preferably, stoichiometric amounts are employed, yielding a more uniform and reproducible product.

The reaction of these amines and the erythritol dicarbonate is readily accomplished without need of a catalyst at a temperature within the range of 0° C. to 140° C. or higher, depending on system reactivity and the fluidity and miscibility of the components. Room temperature reactions are particularly preferred because of the ease of reaction and control. The reaction is preferably conducted in a solvent, for instance ethyl acetate, dimethyl sulfoxide, dimethyl foramide, benzene, etc., to facilitate mixing of reactants and to avoid any extremely vigorous reaction. The solvent method also gives the highest molecular weight polymers. When solvents are employed, the product is readily recovered by vacuum distillation of the solvent at a temperature below the degradation temperature of the polymer, preferably below about 125° C., or by precipitating the solvent by the addition of a nonsolvent for the polymer, such as water or lower aliphatic alcohols.

The product of this invention can vary from hard, brittle polymers having reduced viscosities of as low as 0.2 up to more rubbery, tough polymers having reduced viscosities as high as 0.8 to 2.0 (as determined by reduced viscosity measurements at 25° C. of .2 gram sample in 100 ml. dimethylformamide solution). It is a feature of these products that a longer polymerization time in a solvent at low temperatures such as about 25–30° C. and followed by a curing at elevated temperature (50–75° C.) after removal of the solvent by vacuum distillation will result in high molecular weight polymers having reduced viscosities of 0.8 to 2.0 depending on the polyamines selected. Such polymers are tough, rubbery solids as contrasted to the more brittle and inflexible materials obtained when the polymerization is conducted at higher temperatures, i.e. always in excess of 30° C. These higher temperature polymerizations, we have found, produce polymeric products having lower reduced viscosities of 0.2 up.

The following examples are illustrative of our invention.

*Example 1*

25 parts of 1,4-dichlorobutane-2,3 diol, 27 parts of sodium bicarbonate, and 330 parts of dimethyl sulfoxide were mixed together and maintained at 90° C. for 30 hours. After this time, the mixture was cooled to room temperature, filtered to remove sodium chloride and the dimethyl sulfoxide was removed by stripping under reduced pressure at 100° C. The brown residue remaining was extracted with 2 separate portions of boiling dioxane (465 parts each portion). The dioxane extracts were concentrated to ¼ their previous volume by distillation and were allowed to cool. Crystallization occurred on cooling. The crystals were filtered off and there was obtained 21 parts (77% yield) of white crystals, having a melting point of 164–165° C. identified as erythritol dicarbonate (4,4'bis-1,3-dioxol-2-one) by elemental and infrared analysis:

$C_6H_6O_6$ Calc: percent C=41.39, percent H=3.47.
Found: percent C=41.55, percent H=3.61.

Cyclic Carbonate C=O @ 5.5μ

*Example 2*

6.964 parts of erythritol dicarbonate prepared in the manner of Example 1 was dissolved in 57 parts by weight of dimethylformamide and 4.648 parts of hexamethylenediamine was added and the mixture allowed to stand at room temperature for 24 hours. The dimethylformamide was then removed by heating the mixture to 100° C. for 1½ hours under reduced pressure. The resultant polymer was a white, fibrous material having a reduced viscosity of 0.4, measured as a 0.2 gram sample in 100 milliliters of dimethylformamide at 25° C. On further heating of the polymer for 36 hours at 75° C., the reduced viscosity measured in the same manner had increased to 1.0. Films cast from this polymer by dissolving the polymer in dimethylformamide, casting a thick solution of the polymer onto a smooth surface, and heating to drive off the solvent, were clear and hard and had good tensile strengths. Films absorbed water rapidly standing in air, and swelled slightly on soaking in water. Such films, because of the high rate of moisture transmission, can advantageously be employed as food and material packaging where such effect is desired.

We claim:
1. A resinous polyurethane product prepared by the reaction of erythritol dicarbonate having the formula

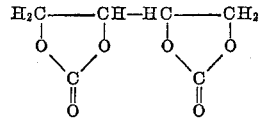

and a polyfunctional aliphatic amine having at least two amino groups containing from 1 to 2, inclusive, replaceable hydrogens, said amine being reacted in amounts sufficient to give the polyurethane product a reduced viscosity of above about 0.2, as determined on a 0.2 gram sample of the product in 100 ml. of dimethylformamide at 25° C.

2. A resinous polyurethane product prepared by the reaction of erythritol dicarbonate having the formula

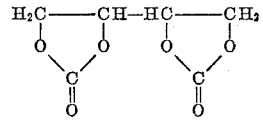

and a polyfunctional amine having the general formula $R^1(NH_2)_x$, where $R^1$ is a polyvalent aliphatic hydrocarbon having a valence equal to $x$ and $x$ is an integer from two to four inclusive, said amine being reacted in amounts sufficient to give the polyurethtane product a reduced viscosity of above about 0.2 as determined on a 0.2 gram sample of the product in 100 ml. of dimethylformamide at 25° C.

3. A substantially linear resinous polyurethane product represented by the repeating unit

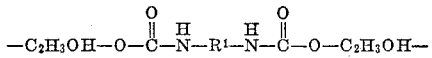

wherein $R^1$ is an aliphatic hydrocarbon radical prepared by the reaction of about equimolar amounts of erythritol dicarbonate having the formula

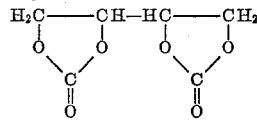

and an aliphatic diprimary diamine.

4. A process for the preparation of resinous polyurethane products which includes the steps of admixing and reacting erythritol dicarbonate having the formula

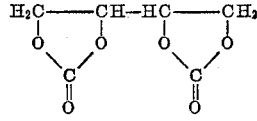

and a polyfunctional aliphatic amine having at least two amino groups containing from 1 to 2, inclusive, replaceable hydrogens, said amine being reacted in amounts sufficient to give the polyurethane product a reduced viscosity of above about 0.2, as determined on a 0.2 gram sample of the product in 100 ml. of dimethylformamide at 25° C. at a temperature within the range of about 0° C. to 140° C.

5. A process for the preparation of resinous polyurethane products which includes the steps of admixing and reacting about equipmolar amounts of erythritol dicarbonate having the formula

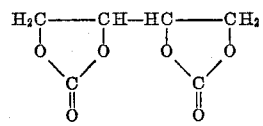

and a polyfunctional aliphatic amine having at least two amino groups containing from 1 to 2, inclusive, replaceable hydrogens, said amine being reacted in amounts sufficient to give the polyurethane product a reduced viscosity of above about 0.2, as determined on a 0.2 gram sample of the product in 100 ml. of dimethylformamide at 25° C. at a temperature within the range of about 0° C. to 140° C. in the presence of a inert liquid media, and thereafter recovering the polymeric product thus produced.

6. A process for the production of a substantially linear resinous polyurethane product which includes the steps of admixing and reacting about equimolar amounts of erythritol dicarbonate having the formula

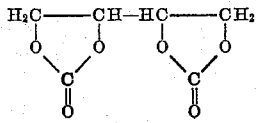

and an aliphatic diprimary diamine in the presence of an inert solvent at a temperature within the range of about 0° C. to about 140° C., and thereafter recovering the polymeric product thus produced.

References Cited in the file of this patent
UNITED STATES PATENTS
2,802,022    Groszos et al. _____ Aug. 6, 1957
FOREIGN PATENTS
109,064    Sweden _____ Nov. 16, 1943